(12) United States Patent  
Gomez et al.

(10) Patent No.: US 10,500,664 B2
(45) Date of Patent: Dec. 10, 2019

(54) CUTTING TORCH GUIDE ASSEMBLY

(71) Applicants: Robert Gomez, Victoria, TX (US); Richard Gomez, Victoria, TX (US)

(72) Inventors: Robert Gomez, Victoria, TX (US); Richard Gomez, Victoria, TX (US)

(*) Notice: Subject to any disclaimer, the term of this patent is extended or adjusted under 35 U.S.C. 154(b) by 281 days.

(21) Appl. No.: 15/584,160

(22) Filed: May 2, 2017

(65) Prior Publication Data

US 2018/0318953 A1 Nov. 8, 2018

(51) Int. Cl.
| B23K 7/10 | (2006.01) |
| B26D 7/00 | (2006.01) |
| B23K 37/02 | (2006.01) |

(52) U.S. Cl.
CPC ............ B23K 7/10 (2013.01); B23K 37/0205 (2013.01); B23K 37/027 (2013.01); B26D 7/0006 (2013.01)

(58) Field of Classification Search
CPC ........... B23K 7/10; B23K 7/102; B23K 7/105
USPC ......................................................... 266/70
See application file for complete search history.

(56) References Cited

U.S. PATENT DOCUMENTS

| 1,768,857 | A |  | 7/1930 | Orzel |  |
|---|---|---|---|---|---|
| D117,504 | S |  | 11/1939 | Smith |  |
| 2,483,294 | A | * | 9/1949 | Miner | B23K 7/105 |
|  |  |  |  |  | 266/66 |
| 2,622,328 | A |  | 12/1952 | Krohn |  |
| 2,879,055 | A |  | 3/1959 | Johnston |  |
| 3,804,391 | A | * | 4/1974 | Case | B23K 7/107 |
|  |  |  |  |  | 266/70 |
| 3,944,194 | A |  | 3/1976 | Robinson |  |
| 4,363,469 | A | * | 12/1982 | Cruzan, II | B23K 7/10 |
|  |  |  |  |  | 266/77 |
| 4,653,195 | A |  | 3/1987 | Esparza |  |
| 6,641,029 | B2 |  | 11/2003 | Bonnell |  |
| 2018/0318953 | A1 | * | 11/2018 | Gomez | B23K 37/0205 |

FOREIGN PATENT DOCUMENTS

WO          WO8803456          5/1988

* cited by examiner

Primary Examiner — Scott R Kastler

(57) ABSTRACT

A cutting torch guide assembly for cutting beveled openings includes a first rod that is hollow. A first sleeve is positioned around and slidably positionable on the first rod. A pin is coupled to and extends perpendicularly from the first sleeve. The pin is configured to couple to a metal substrate to define an axis of a penetration that is to be cut into the metal substrate. A second rod is positioned in and selectively extensible from the first rod. The first sleeve is positionable to select a diameter of the penetration on an opposing side of the metal substrate. The second rod is positionable relative to the first rod to select a thickness of the metal substrate. A ring coupled to the second rod is configured to insert a nozzle of a cutting torch so that the nozzle is positioned to cut a beveled penetration into the substrate.

20 Claims, 6 Drawing Sheets

CUTTING TORCH GUIDE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to guide assemblies and more particularly pertains to a new guide assembly for cutting beveled openings.

SUMMARY OF THE INVENTION

An embodiment of the disclosure meets the needs presented above by generally comprising a first rod that is hollow. A first sleeve is positioned around and slidably positionable on the first rod. A pin is coupled to and extends perpendicularly from the first sleeve. The pin is configured to couple to a metal substrate to define an axis of a penetration that is to be cut into the metal substrate. A second rod is positioned in and selectively extensible from the first rod. The first sleeve is positionable to select a diameter of the penetration on an opposing side of the metal substrate. The second rod is positionable relative to the first rod to select a thickness of the metal substrate. A ring coupled to the second rod is configured to insert a nozzle of a cutting torch so that the nozzle is positioned to cut a beveled penetration into the substrate.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description refers to the annexed drawings wherein.

DETAILED DESCRIPTION OF THE INVENTION

Figure 1:
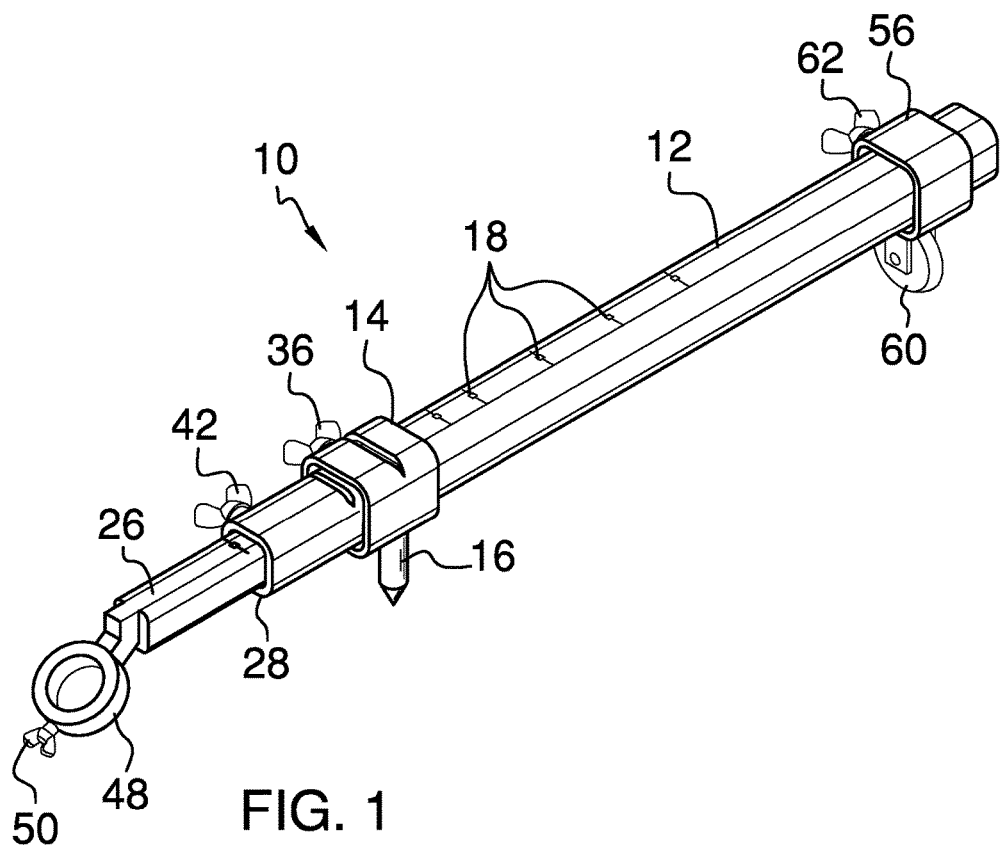
FIG. 1 is an isometric perspective view of a cutting torch guide assembly per an embodiment of the disclosure.
Figure 2:
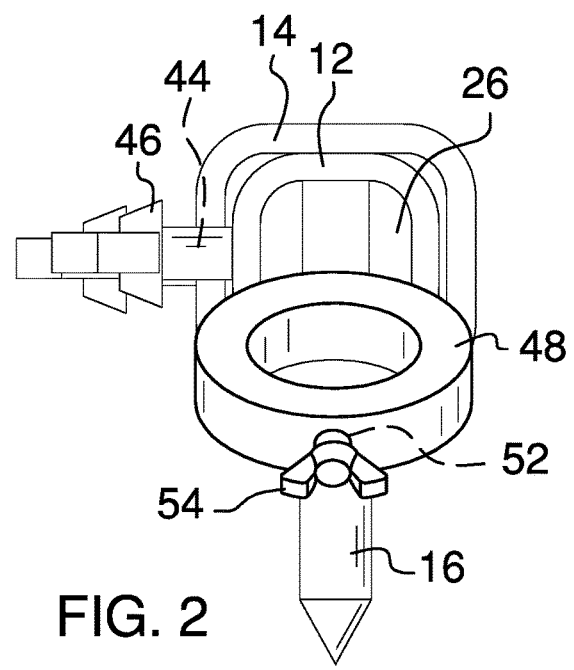
FIG. 2 is an end view of an embodiment of the disclosure.
Figure 3:
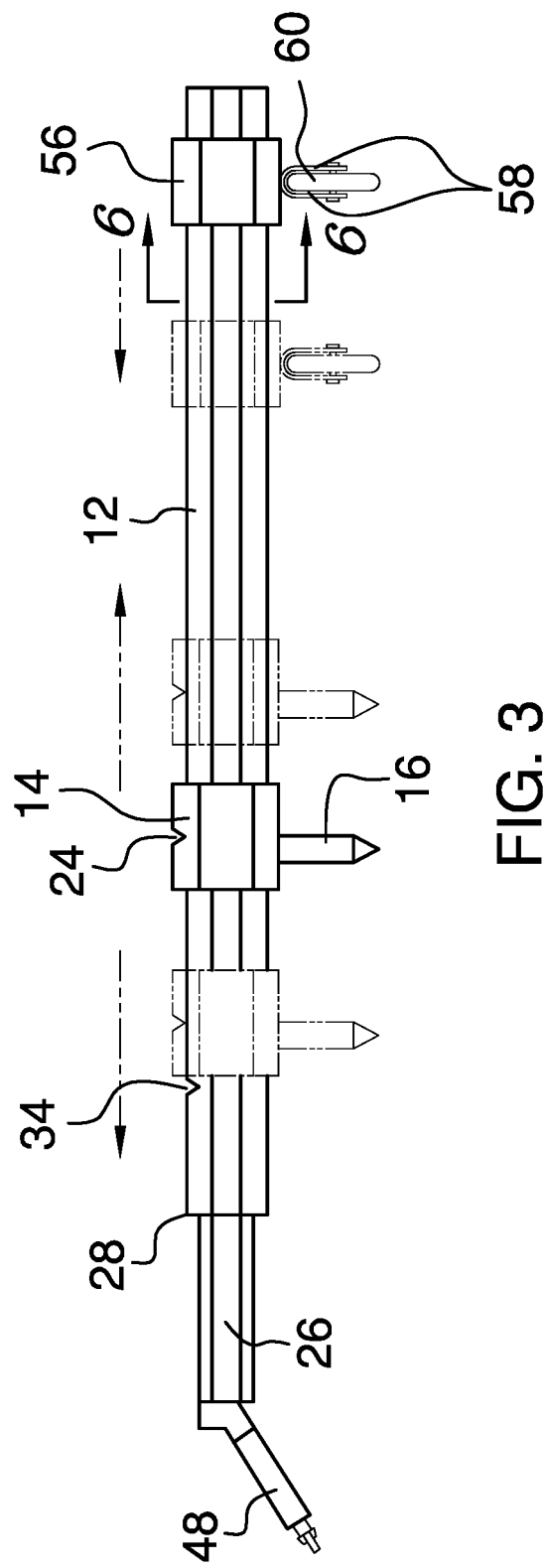
FIG. 3 is a side view of an embodiment of the disclosure.
Figure 4:
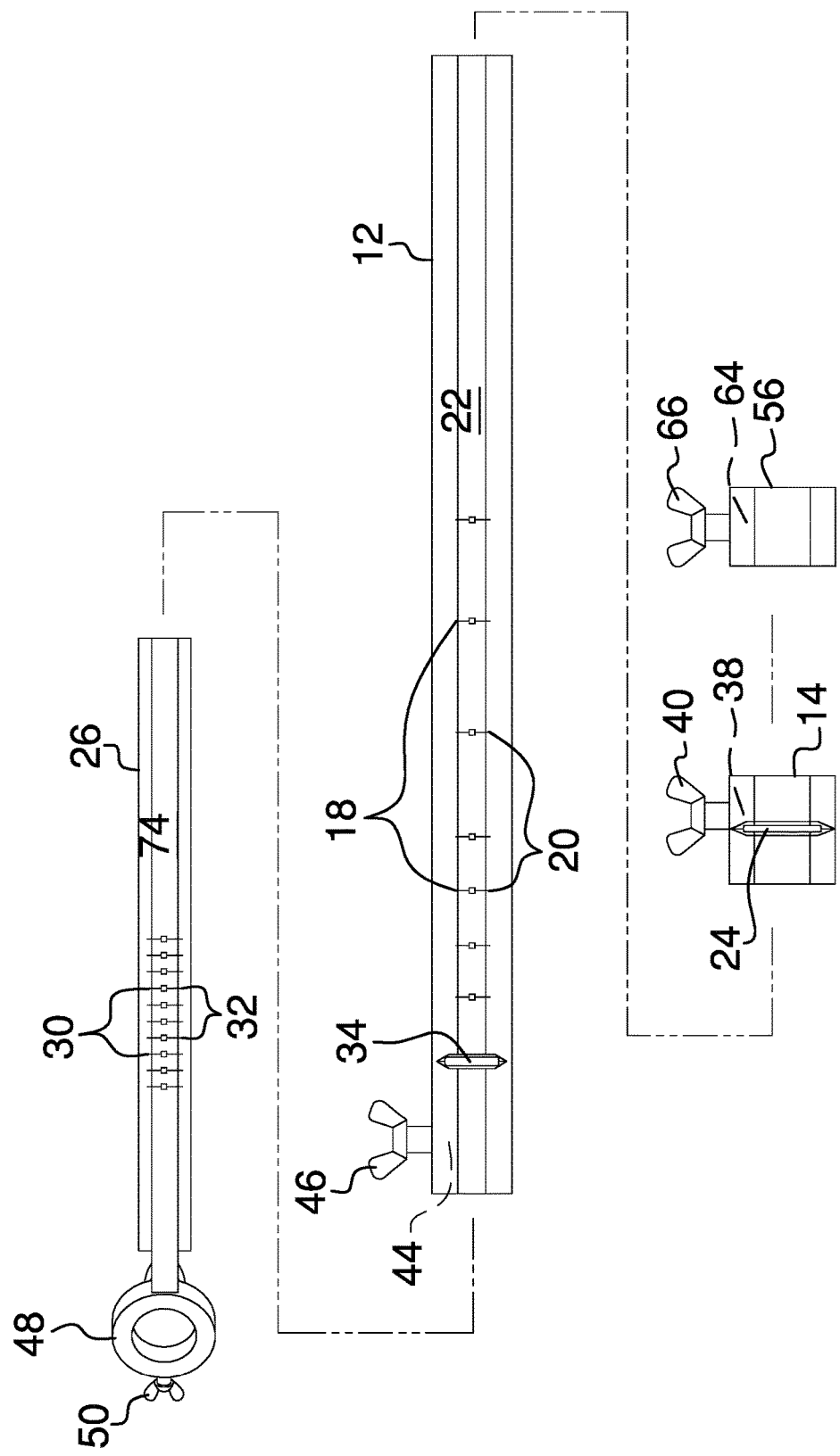
FIG. 4 is an exploded view of an embodiment of the disclosure.
Figure 5:
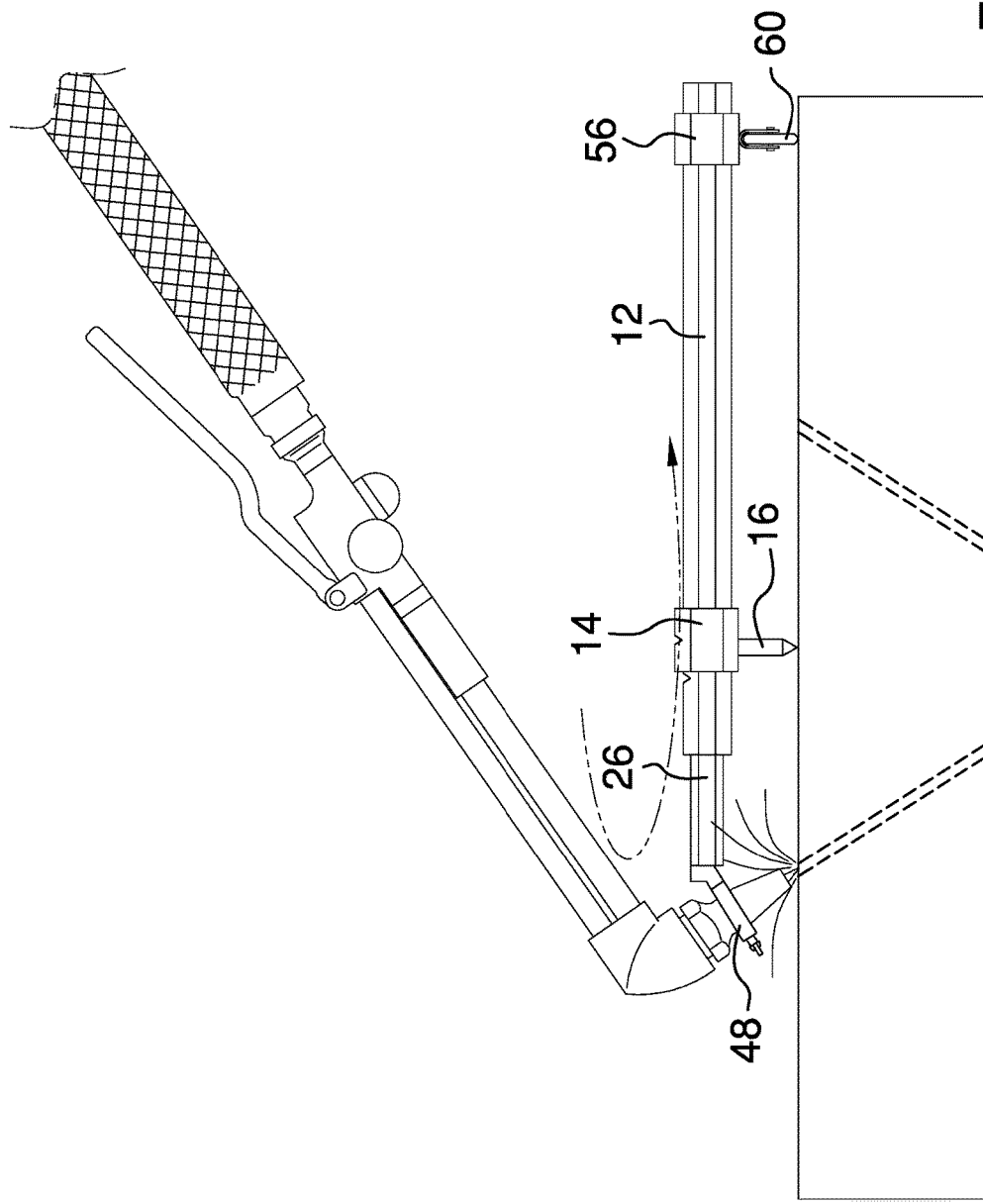
FIG. 5 is an in-use view of an embodiment of the disclosure.
Figure 6:
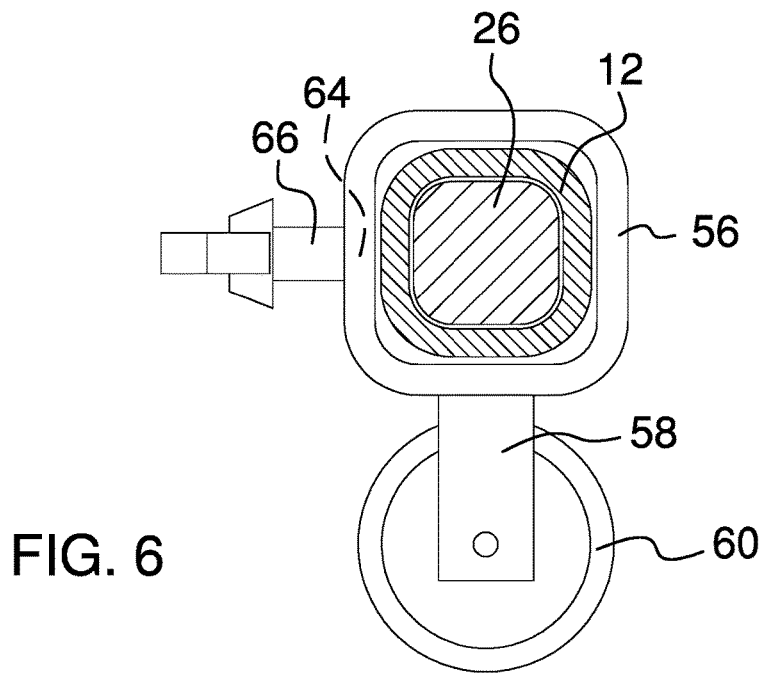
FIG. 6 is a cross-sectional view of an embodiment of the disclosure.
Figure 7:
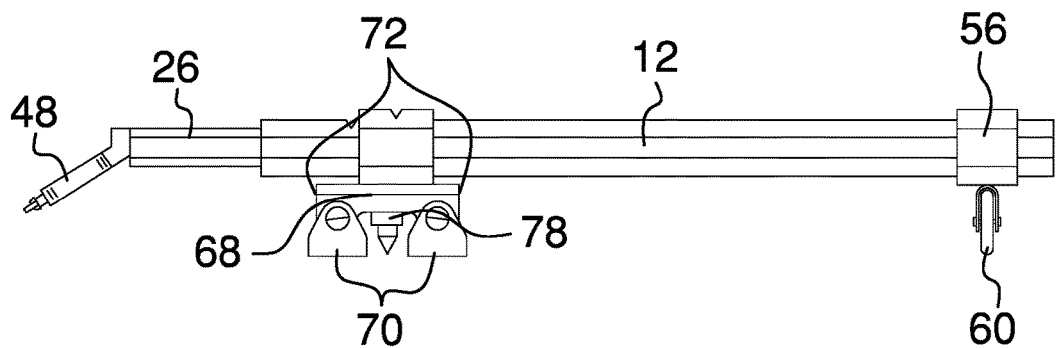
FIG. 7 is a side view of an embodiment of the disclosure.
Figure 8:
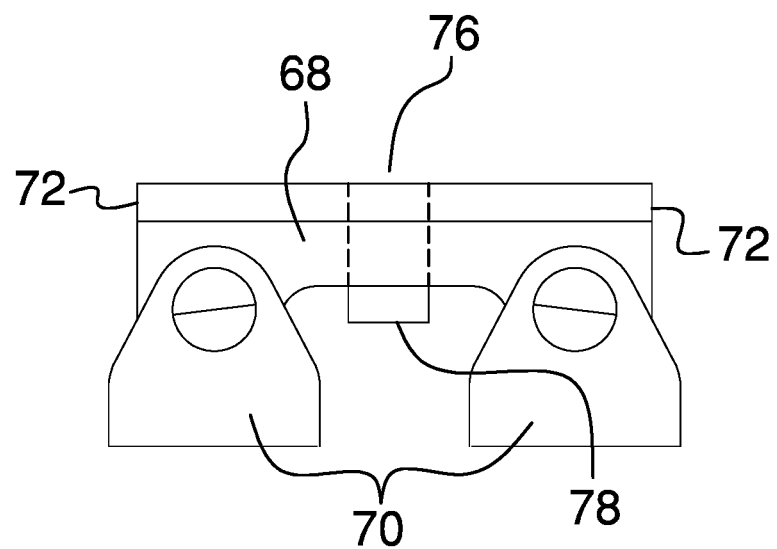
FIG. 8 is a side view of an embodiment of the disclosure.

With reference now to the drawings, and to FIGS. 1 through 7 thereof, a new guide assembly embodying the principles and concepts of an embodiment of the disclosure and generally designated by the reference numeral 10 will be described.

As best illustrated in FIGS. 1 through 7, the cutting torch guide assembly 10 generally comprises a first rod 12 that is hollow. In one embodiment, the first rod 12 is substantially rectangularly shaped when viewed longitudinally. A first sleeve 14 is positioned around the first rod 12. The first sleeve 14 is slidably positionable on the first rod 12. A pin 16 is coupled to and extends perpendicularly from the first sleeve 14. The pin 16 is pointedly shaped distal from the first sleeve 14. The pin 16 is configured to couple to a metal substrate to define an axis of a penetration that is to be cut into the metal substrate.

A plurality of first indicators 18 is coupled to the first rod 12. The first indicators 18 are configured to position the first sleeve 14 to select a diameter of the penetration on an opposing side of the metal substrate. In one embodiment, the first indicators 18 comprise first notches 20 that are positioned in an upper surface 22 of the first rod 12. Each first notch 20 is positioned to indicate a respective diameter of the penetration on the opposing side of the metal substrate. In another embodiment, a first slit 24 is positioned through the first sleeve 14. The first slit 24 is configured to view the first indicators 18 as the first sleeve 14 is motivated longitudinally along the first rod 12.

A second rod 26 is positioned in and selectively extensible from a first end 28 of the first rod 12. A plurality of second indicators 30 is coupled to the second rod 26. The second indicators 30 are configured to position the second rod 26 relative to the first rod 12 to select a thickness of the metal substrate. In one embodiment, the second indicators 30 comprise second notches 32 that are positioned in an upper face 74 of the second rod 26. Each second notch 32 is positioned to indicate a respective thickness of the metal substrate. In another embodiment, a second slit 34 is positioned through the first rod 12. The second slit 34 is configured to view the second indicators 30 as the second rod 26 is extended from the first rod 12.

A first fastener 36 is coupled to the first sleeve 14. The first fastener 36 is selectively couplable to the first rod 12 to couple the first sleeve 14 to the first rod 12. In one embodiment, the first fastener 36 comprises a first hole 38 and a first thumb screw 40. The first hole 38 is positioned through the first sleeve 14 and is complementary to the first thumb screw 40. The first hole 38 is positioned to threadedly insert the first thumb screw 40 to selectively couple the first sleeve 14 to the first rod 12.

A second fastener 42 is coupled to the first rod 12. The second fastener 42 is selectively couplable to the second rod 26 to couple the first rod 12 to the second rod 26. In one embodiment, the second fastener 42 comprises a second hole 44 and a second thumb screw 46. The second hole 44 is positioned through the first rod 12 and is complementary to the second thumb screw 46. The second hole 44 is positioned to threadedly insert the second thumb screw 46 to selectively couple the first rod 12 to the second rod 26.

A ring 48 is coupled to and extends transversely from the second rod 26 distal from the first rod 12. The ring 48 is complementary to a nozzle of a cutting torch. The ring 48 is configured to insert the nozzle of the cutting torch to couple the nozzle to the second rod 26. The nozzle is positioned to cut the penetration into the substrate so that the penetration is conically frustum shaped. The diameter of the penetration on the opposing side of the metal substrate is substantially complementary to a cylindrical object that is to be coupled to the metal substrate. Insertion of the cylindrical object into the penetration defines a circular channel between the cylindrical object and the metal substrate that is configured to house a weld that couples the cylindrical object to the metal substrate.

A third fastener 50 is coupled to the ring 48. The third fastener 50 is selectively couplable to the nozzle of the cutting torch to couple the nozzle to the ring 48. In one embodiment, the third fastener 50 comprises a third hole 52 and a third thumb screw 54. The third hole 52 is positioned through the ring 48 and is complementary to the third thumb screw 54. The third hole 52 is positioned to threadedly insert the third thumb screw 54 to selectively couple the nozzle of the cutting torch to the ring 48.

A second sleeve 56 is positioned around the first rod 12. The second sleeve 56 is slidably positionable on the first rod 12. Each of a pair of arms 58 is coupled to and extends perpendicularly from the second sleeve 56. A wheel 60 is axially coupled to and extends between the pair of arms 58. The wheel 60 is configured to position the first rod 12 substantially parallel to the metal substrate. The wheel 60 also is configured to stabilize the first rod 12 as the first rod 12 is rotated around the pin 16.

A fourth fastener 62 is coupled to the second sleeve 56. The fourth fastener 62 is selectively couplable to the first rod 12 to couple the second sleeve 56 to the first rod 12. In one embodiment, the fourth fastener 62 comprises a fourth hole 64 and a fourth thumb screw 66. The fourth hole 64 is positioned through the second sleeve 56 and is complementary to the fourth thumb screw 66. The fourth hole 64 is positioned to threadedly insert the fourth thumb screw 66 to selectively couple the second sleeve 56 to the first rod 12.

In one embodiment of the invention, the assembly 10 comprises a bar 68. A channel 76 is positioned through the bar 68 substantially equally distant from opposing ends 72 of the bar. The channel 76 is complementary to the pin. The channel 76 is positioned to insert the pin 16 to rotationally couple the pin 16 to the bar 68.

A pair of magnets 70 is pivotally coupled to and extends from the bar 68. Each magnet 70 is positioned proximate to a respective opposing end 72 of the bar 68. The magnets 70 are configured to couple the bar 68 to the metal substrate. The channel 76 is positioned through the bar 68 to retain the pin 16 at the axis of the penetration that is to be cut into the metal substrate. In another embodiment, a tube 78 is coupled to and extends from the bar 68. The tube 78 is complementary to the pin 16 and is alignably positioned with the channel 76. The tube 78 is positioned to stabilize the pin 16 within the channel 76. In yet another embodiment, the tube 78 extends codirectionally with the magnets 70.

In use, the magnets 70 are configured to couple the bar 68 to the metal substrate. The channel 76 that is positioned through the bar 68 is positioned to retain the pin 16 at the axis of the penetration that is to be cut into the metal substrate. The wheel 60 that is positioned on the second sleeve 56 is configured to position the first rod 12 substantially parallel to the metal substrate. The wheel 60 also is configured to stabilize the first rod 12 as the first rod 12 is rotated around the pin 16. The first indicators 18 that are positioned on the first rod 12 are configured to position the first sleeve 14 to select the diameter of the penetration on the opposing side of the metal substrate. The first hole 38 that is positioned through the first sleeve 14 is positioned to threadedly insert the first thumb screw 40 to selectively couple the first sleeve 14 to the first rod 12.

The second indicators 30 that are positioned on the second rod 26 are configured to position the second rod 26 relative to the first rod 12 to select the thickness of the metal substrate. The second hole 44 that is positioned through the first rod 12 is positioned to threadedly insert the second thumb screw 46 to selectively couple the first rod 12 to the second rod 26. The ring 48 that is positioned on the second rod 26 is configured to insert the nozzle of the cutting torch. The third hole 52 that is positioned through the ring 48 is positioned to threadedly insert the third thumb screw 54 to selectively couple the nozzle of the cutting torch to the ring 48. The nozzle is positioned to cut the penetration into the substrate. The penetration is conically frustum shaped. The diameter of the penetration on the opposing side of the metal substrate is substantially complementary to the cylindrical object that is to be is coupled to the metal substrate. Insertion of the cylindrical object into the penetration defines a circular channel between the cylindrical object and the metal substrate that is configured to house the weld that couples the cylindrical object to the metal substrate.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A cutting torch guide assembly comprising:
a first rod, said first rod being hollow;
a first sleeve positioned around said first rod, said first sleeve being slidably positionable on said first rod;
a pin coupled to and extending perpendicularly from said first sleeve, said pin being pointedly shaped distal from said first sleeve;
a plurality of first indicators coupled to said first rod;
a second rod positioned in and selectively extensible from a first end of said first rod;
a plurality of second indicators coupled to said second rod; and
a ring coupled to and extending transversely from said second rod distal from said first rod, said ring being complementary to a nozzle of a cutting torch.

2. The assembly of claim 1, further including said first rod being substantially rectangularly shaped when viewed longitudinally.

3. The assembly of claim 1, further including said first indicators comprising first notches positioned in an upper surface of said first rod, each said first notch being positioned to indicate a respective diameter of the penetration on the opposing side of the metal substrate.

4. The assembly of claim 3, further including a first slit positioned through said first sleeve, wherein said first slit is positioned in said first sleeve such that said first slit is configured for viewing said first indicators as said first sleeve is motivated longitudinally along said first rod.

5. The assembly of claim 1, further including said second indicators comprising second notches positioned in an upper face of said second rod, each said second notch being positioned to indicate a respective thickness of the metal substrate.

6. The assembly of claim 5, further including a second slit positioned through said first rod, wherein said second slit is positioned in said first rod such that said second slit is configured for viewing said second indicators as said second rod is extended from said first rod.

7. The assembly of claim 1, further including a first fastener coupled to said first sleeve, said first fastener being selectively couplable to said first rod to couple said first sleeve to said first rod.

8. The assembly of claim 7, further including said first fastener comprising a first hole and a first thumb screw, said first hole being positioned through said first sleeve, said first hole being complementary to said first thumb screw, wherein said first hole is positioned through said first sleeve such that said first hole is positioned for threadedly inserting said first thumb screw for selectively coupling said first sleeve to said first rod.

9. The assembly of claim 1, further including a second fastener coupled to said first rod, said second fastener being selectively couplable to said second rod to couple said first rod to said second rod.

10. The assembly of claim 9, further including said second fastener comprising a second hole and a second thumb screw, said second hole being positioned through said first rod, said second hole being complementary to said second thumb screw, wherein said second hole is positioned through said first rod such that said second hole is positioned for threadedly inserting said second thumb screw for selectively coupling said first rod to said second rod.

11. The assembly of claim 1, further including a third fastener coupled to said ring, said third fastener being selectively couplable to the nozzle of the cutting torch to couple the nozzle to said ring.

12. The assembly of claim 11, further including said third fastener comprising a third hole and a third thumb screw, said third hole being positioned through said ring, said third hole being complementary to said third thumb screw, wherein said third hole is positioned through said ring such that said third hole is positioned for threadedly inserting said third thumb screw for selectively coupling the nozzle of the cutting torch to couple the nozzle to said ring.

13. The assembly of claim 1, further comprising:
a second sleeve positioned around said first rod, said second sleeve being slidably positionable on said first rod;
a pair of arms coupled to and extending perpendicularly from said second sleeve;
a wheel axially coupled to and extending between said pair of arms; and
wherein said wheel is positioned on said second sleeve such that said wheel is configured for positioning said first rod substantially parallel to the metal substrate and wherein said wheel is configured for stabilizing said first rod as said first rod is rotated around said pin.

14. The assembly of claim 13, further including a fourth fastener coupled to said second sleeve, said fourth fastener being selectively couplable to said first rod to couple said second sleeve to said first rod.

15. The assembly of claim 14, further including said fourth fastener comprising a fourth hole and a fourth thumb screw, said fourth hole being positioned through said second sleeve, said fourth hole being complementary to said fourth thumb screw, wherein said fourth hole is positioned through said second sleeve such that said fourth hole is positioned for threadedly inserting said fourth thumb screw for selectively coupling said second sleeve to said first rod.

16. The assembly of claim 1, further comprising
a bar;
a channel positioned through said bar substantially equally distant from opposing ends of said bar, said channel being complementary to said pin;
a pair of magnets pivotally coupled to and extending from said bar, each said magnet being positioned proximate to a respective said opposing end of said bar; and
wherein said channel is positioned for inserting said pin for rotationally coupling said pin to said bar, wherein said magnets are configured for coupling said bar to the metal substrate such that said channel is positioned for retaining said pin at the axis of the penetration that is to be cut into the metal substrate.

17. The assembly of claim 16, further including a tube coupled to and extending from said bar, said tube being complementary to said pin and alignably positioned with said channel, wherein said tube is positioned on said bar such that said tube in positioned to stabilize said pin within said channel.

18. The assembly of claim 17, further including said tube extending codirectionally with said magnets.

19. A cutting torch guide assembly comprising:
a first rod, said first rod being hollow, said first rod being substantially rectangularly shaped when viewed longitudinally;
a first sleeve positioned around said first rod, said first sleeve being slidably positionable on said first rod;

a pin coupled to and extending perpendicularly from said first sleeve, said pin being pointedly shaped distal from said first sleeve, wherein said pin is positioned on said first sleeve such that said pin is configured for coupling to a metal substrate defining an axis of a penetration to be cut into the metal substrate;

a plurality of first indicators coupled to said first rod, wherein said first indicators are positioned on said first rod such that said first indicators are configured for positioning said first sleeve for selecting a diameter for the penetration on an opposing side of the metal substrate, said first indicators comprising first notches positioned in an upper surface of said first rod, each said first notch being positioned to indicate a respective diameter of the penetration on the opposing side of the metal substrate;

a first slit positioned through said first sleeve, wherein said first slit is positioned in said first sleeve such that said first slit is configured for viewing said first indicators as said first sleeve is motivated longitudinally along said first rod;

a second rod positioned in and selectively extensible from a first end said first rod;

a plurality of second indicators coupled to said second rod, wherein said second indicators are positioned on said second rod such that said second indicators are configured for positioning said second rod relative to said first rod for selecting a thickness of the metal substrate, said second indicators comprising second notches positioned in an upper face of said second rod, each said second notch being positioned to indicate a respective thickness of the metal substrate;

a second slit positioned through said first rod, wherein said second slit is positioned in said first rod such that said second slit is configured for viewing said second indicators as said second rod is extended from said first rod;

a first fastener coupled to said first sleeve, said first fastener being selectively couplable to said first rod to couple said first sleeve to said first rod, said first fastener comprising a first hole and a first thumb screw, said first hole being positioned through said first sleeve, said first hole being complementary to said first thumb screw, wherein said first hole is positioned through said first sleeve such that said first hole is positioned for threadedly inserting said first thumb screw for selectively coupling said first sleeve to said first rod;

a second fastener coupled to said first rod, said second fastener being selectively couplable to said second rod to couple said first rod to said second rod, said second fastener comprising a second hole and a second thumb screw, said second hole being positioned through said first rod, said second hole being complementary to said second thumb screw, wherein said second hole is positioned through said first rod such that said second hole is positioned for threadedly inserting said second thumb screw for selectively coupling said first rod to said second rod;

a ring coupled to and extending transversely from said second rod distal from said first rod, said ring being complementary to a nozzle of a cutting torch, wherein said ring is positioned on said second rod such that said ring is configured for inserting the nozzle of the cutting torch to couple the nozzle to said second rod such that the nozzle is positioned for cutting the penetration into said substrate such that the penetration is conically frustum shaped such that the diameter of the penetration on the opposing side of the metal substrate is substantially complementary to a cylindrical object that is to be coupled to the metal substrate, such that insertion of the cylindrical object into the penetration defines a circular channel between the cylindrical object and the metal substrate that is configured for housing a weld that couples the cylindrical object to the metal substrate;

a third fastener coupled to said ring, said third fastener being selectively couplable to the nozzle of the cutting torch to couple the nozzle to said ring, said third fastener comprising a third hole and a third thumb screw, said third hole being positioned through said ring, said third hole being complementary to said third thumb screw, wherein said third hole is positioned through said ring such that said third hole is positioned for threadedly inserting said third thumb screw for selectively coupling the nozzle of the cutting torch to couple the nozzle to said ring;

a second sleeve positioned around said first rod, said second sleeve being slidably positionable on said first rod;

a pair of arms coupled to and extending perpendicularly from said second sleeve;

a wheel axially coupled to and extending between said pair of arms, wherein said wheel is positioned on said second sleeve such that said wheel is configured for positioning said first rod substantially parallel to the metal substrate and wherein said wheel is configured for stabilizing said first rod as said first rod is rotated around said pin; and a fourth fastener coupled to said second sleeve, said fourth fastener being selectively couplable to said first rod to couple said second sleeve to said first rod, said fourth fastener comprising a fourth hole and a fourth thumb screw, said fourth hole being positioned through said second sleeve, said fourth hole being complementary to said fourth thumb screw, wherein said fourth hole is positioned through said second sleeve such that said fourth hole is positioned for threadedly inserting said fourth thumb screw for selectively coupling said second sleeve to said first rod.

20. The assembly of claim 19, further comprising:

a bar;

a channel positioned through said bar substantially equally distant from opposing ends of said bar, said channel being complementary to said pin;

a pair of magnets pivotally coupled to and extending from said bar, each said magnet being positioned proximate to a respective said opposing end of said bar;

a tube coupled to and extending from said bar, said tube being complementary to said pin and alignably positioned with said channel, said tube extending codirectionally with said magnets; and wherein said channel is positioned for inserting said pin for rotationally coupling said pin to said bar, wherein said tube is positioned on said bar such that said tube in positioned to stabilize said pin within said channel, wherein said magnets are configured for coupling said bar to the metal substrate such that said channel is positioned for retaining said pin at the axis of the penetration that is to be cut into the metal substrate.

* * * * *